US011620166B2

(12) United States Patent
Moyer et al.

(10) Patent No.: US 11,620,166 B2
(45) Date of Patent: Apr. 4, 2023

(54) COMMUNICATIONS FRAMEWORK FOR MULTI-CLUSTER MANAGEMENT SYSTEMS

(71) Applicant: VMware, Inc., Palo Alto, CA (US)

(72) Inventors: Matt Moyer, Kansas City, MO (US); Tao Jiang, Maple Grove, MN (US); Xavier Stevens, Portland, OR (US); Anusha Muthyampeta, Bellevue, WA (US); Fabio Yeon, Mill Creek, WA (US)

(73) Assignee: VMware, Inc., Palo Alto, CA (US)

( * ) Notice: Subject to any disclaimer, the term of this patent is extended or adjusted under 35 U.S.C. 154(b) by 365 days.

(21) Appl. No.: 16/848,757

(22) Filed: Apr. 14, 2020

(65) Prior Publication Data

US 2021/0318914 A1 Oct. 14, 2021

(51) Int. Cl.
*G06F 16/00* (2019.01)
*G06F 9/50* (2006.01)
*G06F 9/54* (2006.01)
*G06F 16/2455* (2019.01)
*G06F 16/22* (2019.01)
*G06F 16/28* (2019.01)

(52) U.S. Cl.
CPC ............ *G06F 9/5083* (2013.01); *G06F 9/542* (2013.01); *G06F 16/2282* (2019.01); *G06F 16/24568* (2019.01); *G06F 16/285* (2019.01)

(58) Field of Classification Search
CPC .... G06F 9/5083; G06F 9/542; G06F 16/2282; G06F 16/24568; G06F 16/285
See application file for complete search history.

(56) References Cited

U.S. PATENT DOCUMENTS

| 9,639,338 | B2 | 5/2017 | Ruehl et al. | |
| 9,734,237 | B2 | 8/2017 | Ginter | |
| 10,361,917 | B1 * | 7/2019 | Parthasarathy | ..... H04L 41/0859 |
| 10,467,241 | B2 | 11/2019 | Thayer et al. | |
| 10,469,318 | B1 * | 11/2019 | Parthasarathy | ....... H04L 47/803 |

(Continued)

OTHER PUBLICATIONS

Related to pending U.S. Appl. No. 16/837,669; Non-Final Office Action dated Oct. 12, 2021.

(Continued)

*Primary Examiner* — Alexander Khong (57) ABSTRACT

A framework for facilitating communication between a multi-cluster management (MCM) system and the clusters managed by the system is provided. According to one set of embodiments, the framework comprises two independent, unidirectional communications channels: a first channel (i.e., "intent channel") that flows from the MCM system to each cluster, and a second channel (i.e., "data sync channel") that flows from each cluster to the MCM system. Through the intent channel, the MCM system can deliver control information to each cluster for actuating management changes/operations therein in a manner that is robust against network dropouts and packet loss. Through the data sync channel, the MCM system can collect and process status information from each cluster (such as, e.g., object state transitions triggered by the control information sent via the intent channel) in a manner that can efficiently scale to support large numbers of clusters.

21 Claims, 6 Drawing Sheets

(56) References Cited

U.S. PATENT DOCUMENTS

| | | | |
|---|---|---|---|
| 10,965,752 B1* | 3/2021 | Smith | H04L 67/60 |
| 11,080,041 B1 | 8/2021 | Ah Kun et al. | |
| 2005/0091346 A1 | 4/2005 | Krishnaswami et al. | |
| 2008/0301175 A1 | 12/2008 | Applebaum et al. | |
| 2010/0023937 A1 | 1/2010 | Kothari et al. | |
| 2010/0049637 A1 | 2/2010 | Laventman et al. | |
| 2010/0114618 A1 | 5/2010 | Wilcock et al. | |
| 2010/0115490 A1 | 5/2010 | Wilcock et al. | |
| 2010/0250608 A1 | 9/2010 | Malviya et al. | |
| 2011/0213870 A1 | 9/2011 | Cai et al. | |
| 2013/0282994 A1 | 10/2013 | Wires et al. | |
| 2015/0058484 A1 | 2/2015 | Mehta et al. | |
| 2015/0215376 A1 | 7/2015 | Kranz et al. | |
| 2018/0046951 A1 | 2/2018 | Mohindra et al. | |
| 2018/0198868 A1 | 7/2018 | Klaghofer et al. | |
| 2018/0278675 A1 | 9/2018 | Thayer et al. | |
| 2018/0367363 A1 | 12/2018 | Jaeger | |
| 2019/0222988 A1 | 7/2019 | Maes et al. | |
| 2019/0235775 A1* | 8/2019 | Zwiegincew | G06F 3/0619 |
| 2020/0076685 A1 | 3/2020 | Vaidya et al. | |
| 2020/0193043 A1 | 6/2020 | Hoehmann et al. | |
| 2020/0304599 A1 | 9/2020 | Kanso et al. | |
| 2020/0348918 A1* | 11/2020 | Giannetti | G06F 8/60 |
| 2020/0379816 A1 | 12/2020 | Lin et al. | |
| 2021/0042314 A1* | 2/2021 | Batlle | G06F 16/22 |
| 2021/0084103 A1* | 3/2021 | Smith | H04L 67/1034 |
| 2021/0185125 A1* | 6/2021 | Smith | G06F 11/1479 |
| 2021/0200814 A1 | 7/2021 | Tal et al. | |
| 2021/0312392 A1 | 10/2021 | Zhou et al. | |
| 2021/0318913 A1 | 10/2021 | Moyer et al. | |
| 2022/0043692 A1 | 2/2022 | Moyer et al. | |

OTHER PUBLICATIONS

Related to pending U.S. Appl. No. 16/837,669; Final Office Action dated May 2, 2022.

Relating to granted U.S. Appl. No. 16/848,725; Non-Final Office Action dated Apr. 15, 2021.

Related to Granted U.S. Appl. No. 16/848,725; Notice of Allowance dated Jul. 26, 2021.

Related to pending U.S. Appl. No. 17/510,178; Non-Final Office Action dated Jun. 8, 2022.

E. Yang, Y. Zhang, L. Wu, Y. Liu and S. Liu, "A Hybrid Approach to Placement of Tenants for Service-Based Multi-tenant Saas Application," 2011 IEEE Asia-Pacific Services Computing Conference, Jeju, Korea (South), 2011, pp. 124-130, doi: 10.1109/APSCC.2011. 35. (Year: 2011).

C. Fehling, F. Leymann, D. Schumm, R. Konrad, R. Mietzner and M. Pauly, "Flexible Process-Based Applications in Hybrid Clouds", 2011 IEEE 4th International Conference on Cloud Computing, Washington, DC, USA, 2011, pp. 81-88, doi: 10.1109/ CLOUD .2011.37. (Year: 2011).

T. Kwok, T. Nguyen and L. Lam, "A Software as a Service with Multi-tenancy Support for an Electronic Contract Management Application", 2008 IEEE International Conference on Services Computing, Honolulu, HI, USA, 2008, pp. 179-186, doi: 10.1109/ SCC .2008.138. (Year: 2008).

Mixed-Tenancy Systems—A hybrid Approach between Single and Multi-Tenancy Aug. 2014 Edition: 1Publisher: Dr. Hu!ISBN: 9783843916646 Authors: Stefan T. Ruehl (Year: 2014).

"Ingress", https://kubernetes.io/docs/concepts/servicesnetworking/ingress; Mar. 31, 2020.

"Extending you Kubernetes Cluster", URL https://kubernetes.io/docs/concepts/extend-kubernetes/api-extension/custom-resources; Nov. 20, 2018.

"Amazon RDS Multi-AZ deployments"; https://aws.amazon.com/rds/details/multi-az; downloaded May 4, 2020.

Bobby Tables, "Dynamic Kubernetes Informers", https://www.firehydrant.io/blog/dynamic-kubernetes-informers/; Aug. 28, 2019.

"Pod Overview", https://kubernetes.io/docs/concepts/workloads/pods/podoverview/; Apr. 21, 2020.

Colm MacCárthaigh, "Workload isolation using shuffle-sharding", 2019. https://aws.amazon.com/builders-library/workload-isolation-using-shuffle-sharding/; downloaded May 4, 2020.

Reuven Krebs, Chrislof Momm, and Samuel Kounev. Architectural concerns in multi-tenant saas applications. Closer, 12:426-431, Apr. 2012.

URL https://cloud.vmware.com/lanzu-mission-conlrol; downloaded May 4, 2020.

Amazon elastic compute cloud {amazon ec2), 2020. URL https://aws.amazon.com/ec2/; downloaded May 5, 2020.

Kuberneles, 2020. URL https://kuberneles.io/; downloaded May 1, 2020.

Envoy proxy, 2020. URL https:/lwww.envoyproxy.io; downloaded May 1, 2020.

James C Corbell, Jeffrey Dean, Michael Epstein, Andrew Fikes, Christopher Frost, Jeffrey John Furman, Sanjay Bhemawal, Andrey Gubarev, Christopher Heiser, Peter Hochschild, et al. Spanner: Google's globally distributed Database. ACM Transactions on Computer Systems, vol. 31, No. 3, Article 8, Publication dale: Aug. 2013.

Giuseppe Decandia et al., "Dynamo: amazon's highly available key-value store", ACM SIGOPS operating systems eview, 41 (6):205-220, Oct. 2004.

Craig D Weissman et al., "The Design of the Force.com Multitenant Internet Application Development Platform", In Proceedings of the 2009 ACM SIGMOD International Conference on Management of data, pp. 889-896, Jun. 29, 2009.

How we took our server side application to the cloud and liked what we got, hllps://www.slideshare.net/DevopsCon/how-we-look-our-server-sideapplicalion-lo-lhe-cloud-and-liked-what-we-got-16237021; Jan. 29, 2013.

Mike Arpaia, Using a Kubernetes Operator to Manage Tenancy in a B2B Saa app; https://blog.kolide.com/using-a-kubernetes-operator-to-managetenancy-in-a-b2b-saas-app-250f1 c9416ce, May 15, 2018.

Howard Yoo, "Wavefront Architecture", https://confluence.eng.vmware.com/display/PS/Wavefronl+Archilecture; Oct. 29,2019.

Sanjeev Rampal et al., https://github.com/kubernetes/community/tree/master/wgmultitenancy; downloaded May 4, 2020.

Consistent Infrastructure Consistent Operations, https://cloud.vmware.com; downloaded May 4, 2020.

Related to pending U.S. Appl. No. 16/837,669; Non-Final Office Action dated Nov. 3, 2022.

* cited by examiner

COMMUNICATIONS FRAMEWORK FOR MULTI-CLUSTER MANAGEMENT SYSTEMS

BACKGROUND

Kubernetes is an open-source software platform for orchestrating the deployment, scheduling, and scaling of containerized applications (i.e., software applications whose program code and dependencies are packaged into a standardized format, known as a container image, that can be uniformly run in different computing environments). A Kubernetes cluster is a group of physical or virtual machines on which an instance of the Kubernetes platform and the containerized applications it orchestrates are placed and run.

For high availability and other reasons, it is becoming increasingly common for organizations that use Kubernetes to deploy their containerized workloads across multiple Kubernetes clusters. To help such organizations manage their cluster fleets, various software vendors have developed multi-cluster management (MCM) systems. Generally speaking, these MCM systems provide a control plane that is communicatively coupled with an organization's clusters and that allows users of the organization to carry out management operations on those clusters in a centralized manner.

One challenge with designing the communications interface between an MCM system and its associated clusters is that the network connections between these entities can occasionally become unstable (e.g., drop packets or go offline). Among other things, this can adversely affect the ability of the MCM system to communicate control information to the clusters for actuating user-initiated management changes/operations. Further, as the number of clusters increases, the volume of status information that is sent by the clusters to the MCM system on an ongoing basis can grow to become very high. This high volume of incoming data can impact the performance and scalability of the MCM system.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Overview

Embodiments of the present disclosure are directed to a framework for facilitating communication between a multi-cluster management (MCM) system and the clusters managed by the system. At a high level, this framework comprises two independent, unidirectional communications channels: a first channel (referred to herein as the "intent channel") that flows from the MCM system to each cluster, and a second channel (referred to herein as the "data sync channel") that flows from each cluster to the MCM system. Through the intent channel, the MCM system can deliver control information to each cluster for actuating management changes/operations therein in a manner that is robust against network dropouts and packet loss. Further, through the data sync channel, the MCM system can collect and process status information from each cluster (such as, e.g., object state transitions triggered by the control information sent via the intent channel) in a manner that can efficiently scale to support large numbers of clusters.

The foregoing and other aspects of the present disclosure are described in further detail below. It should be noted that while the present disclosure focuses on MCM systems that manage Kubernetes clusters for purposes of explanation and illustration, the same or substantially similar concepts may be applied to MCM systems that manage other types of computer clusters, such as host clusters in a virtualized deployment, distributed database clusters, and so on. Accordingly, all references to "Kubernetes cluster" herein may be substituted with the more generic terms "computer cluster" or "cluster."

2. Example Operating Environment and Solution Architecture

Figure 1:
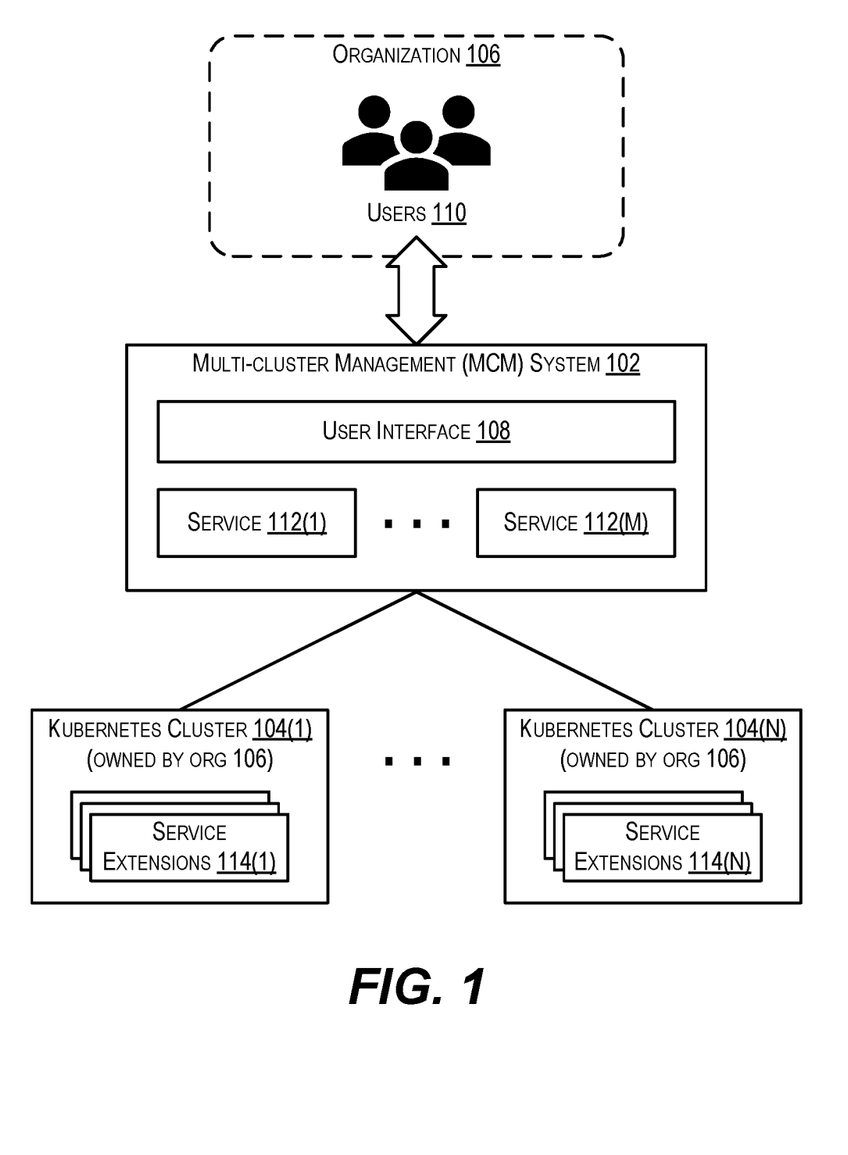
FIG. 1 depicts an example operating environment according to certain embodiments.

FIG. 1 depicts an example operating environment 100 in which embodiments of the present disclosure may be implemented. As shown, operating environment 100 includes an MCM system 102 that is communicatively coupled with a number of Kubernetes clusters 104(1)-(N) owned by an organization 106. In one set of embodiments, MCM system 102 may be deployed on one or more physical or virtual machines that are located on-premises with respect to organization 106, such as at a data center that is owned and operated by the organization. In other embodiments, MCM system 102 may be hosted in a public or private cloud and maintained by, e.g., a third-party SaaS (Software-as-a-Service) provider. Similarly, each Kubernetes cluster 104 may be deployed on-premises with respect to organization 106 or hosted off-premises in a public or private cloud environment.

MCM system 102 includes a user interface (UI) 108 that is accessible by a set of users 110 (e.g., information technology (IT) staff, application developers, etc.) of organization 106. In addition, MCM system 102 includes a number of software services 112(1)-(M) that implement, in cooperation with cluster-side service extensions 114(1)-(N), various functionalities/features for managing clusters 104(1)-(N). For example, services 112(1)-(N) can include a scanner service for executing inspection scans on clusters 104(1)-(N), a security service for setting access policies on clusters 104(1)-(N), a namespace service for creating and managing namespaces on clusters 104(1)-(N), and so on.

In operation, users 110 of organization 106 can login to MCM system 102 and interact with services 112(1)-(M) via UI 108. Through these interactions, the users can define and execute management operations on clusters 104(1)-(N) in accordance with the functionalities/features implemented by the services. For example, assume a user A of organization 106 wishes to create a new namespace N in cluster 104(1). In this case, user A can submit a request to create namespace N in this cluster via UI 108 and the request can be forwarded to the namespace service. Upon receiving the request, the namespace service can generate control information for creating namespace N and the control information can be sent from MCM system 102 to cluster 104(1). A corresponding namespace service extension running within cluster 104(1) can then process the received control information and create namespace N in that cluster.

As noted in the Background section, one challenge with designing an MCM system such as system 102 of FIG. 1 is that the network connections between the MCM system and its managed clusters may be lossy (i.e., prone to packet loss) and/or experience intermittent failure/downtime. This makes it difficult to ensure that each cluster will receive and apply the control information originating from the MCM system's various services in a correct and consistent manner. For instance, in the example above where user A creates namespace N in cluster 104(1), assume that user A subsequently decides to delete namespace N in the cluster and then create it again. Further assume that these three management operations are communicated to cluster 104(1) as three sequential control commands (i.e., "create namespace N," "delete namespace N," and "create namespace N"), and a network problem between MCM system 102 and cluster 104(1) causes the "delete namespace N" command to be lost and resent to cluster 104(1) after the second "create namespace N" command. In this scenario, because the "delete namespace N" command is the last command received and processed by cluster 104(1), namespace N will not appear in the cluster once all three commands are processed (even though user A intended for the namespace to be recreated after its deletion).

Another challenge is that, for many management operations, is it useful for each cluster to send status information back to the MCM system indicating the state of objects in the cluster that have been affected/modified by those operations (so that, for example, the system's services can confirm completion of the operations to the originating users); however, depending on the number of connected clusters, the volume of this returning status information can be very high (e.g., on the order of gigabytes per hour or more), which can overwhelm the MCM system and lead to poor performance and latency for the system's users.

Figure 2:
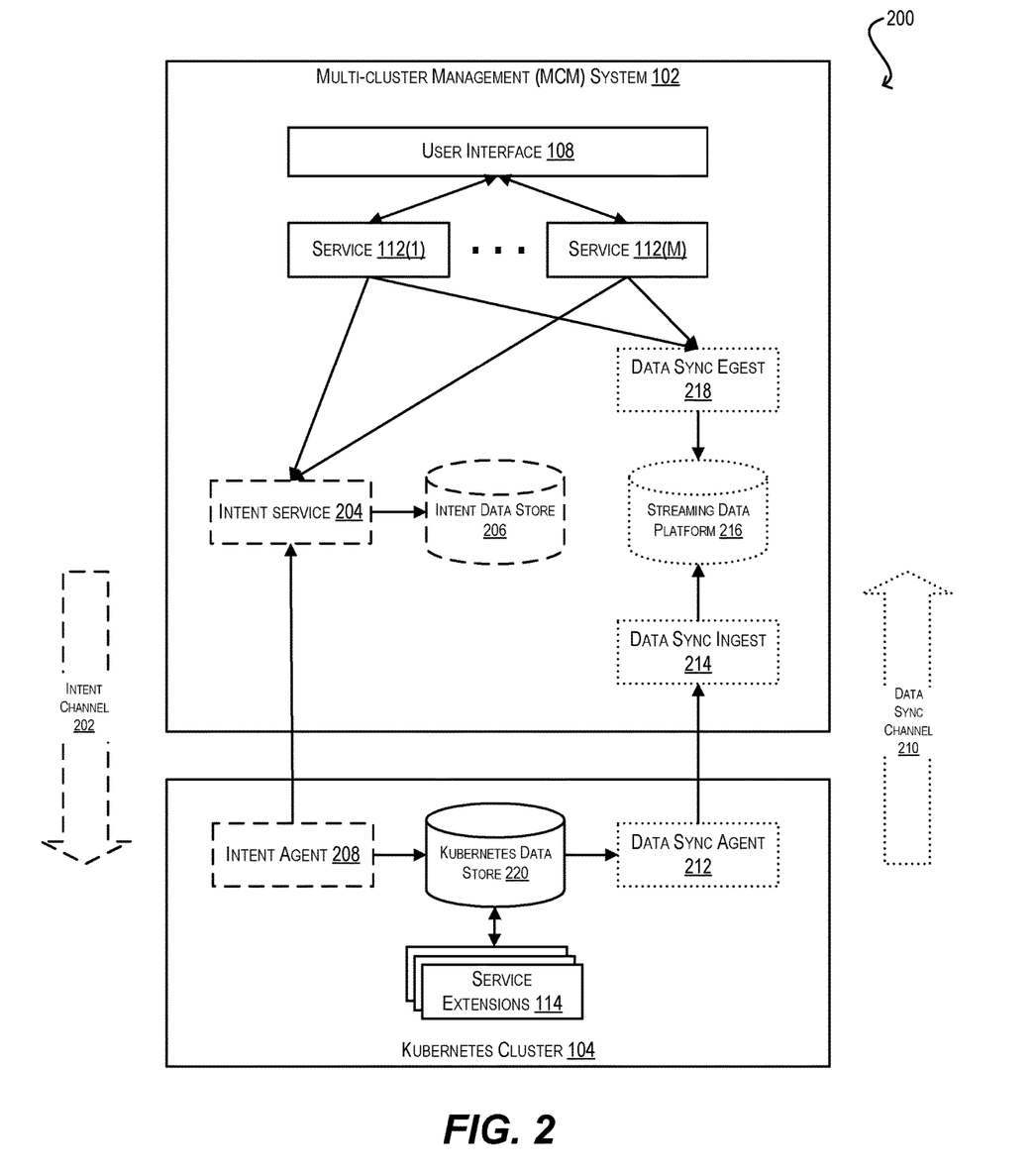
FIG. 2 depicts a framework for enabling communication between an MCM system and a cluster managed by the system according to certain embodiments.

To address the foregoing and other related issues, FIG. 2 depicts the architecture of a novel communications framework 200 that can be implemented by MCM system 102 and each cluster 104 of FIG. 1 according to certain embodiments. As shown in FIG. 2, framework 200 includes a first communications channel (i.e., intent channel) 202 flowing from MCM system 102 to cluster 104 that comprises an intent service 204 and intent data store 206 on MCM system 102 and an intent agent 208 on cluster 104 (illustrated with dashed lines). In addition, framework 200 includes a second communications channel (i.e., data sync channel) 210 flowing from cluster 104 to MCM system 102 that comprises a data sync agent 212 on cluster 104 and a data sync ingest module 214, streaming data platform 216, and data sync egest module 218 on MCM system 102 (illustrated with dotted lines).

With respect to intent channel 202, each time a user 110 initiates a management operation on cluster 104 via UI 108, a service 112 responsible for handling the operation can construct a data structure (such as, e.g., a Kubernetes custom resource definition (CRD)) that defines/declares a "desired state" of cluster 104 in accordance with the management operation and can pass the constructed data structure to intent service 204. In various embodiments, this desired state can reflect the state that cluster 104 should be in (in terms of what object(s) should exist in the cluster and what properties those object(s) should exhibit) upon successful completion of the management operation. For example, if the management operation is the creation of a new namespace N in cluster 104, the data structure can define the existence of namespace N in the cluster. As another example, if the management operation involves the application of an access policy with a user-role binding B to cluster 104, the data structure can define the existence of user-role binding B in the cluster. Upon receiving the data structure from service 112, intent service 204 can create an "intent object" that encapsulates the data structure—along with certain additional metadata such as an intent ID (which uniquely identifies the intent object), a cluster ID (which identifies the cluster to which the intent is directed), a status (which indicates the current status of the intent object), a timestamp (which indicates the time at which the intent object was created), and so on—and can store the intent object in intent data store 206.

Concurrently with the above, cluster-side intent agent 208 can periodically poll intent service 204 for all of the "new" intent objects in intent data store 206 that are intended for cluster 104 (in other words, intent objects that have not yet been received and processed by the cluster). In response, intent service 204 can retrieve the new intent objects for cluster 104 from intent data store 206 and transmit those intent objects to intent agent 208. Intent agent 208 can subsequently apply the received intent objects to cluster 104 (which can involve, e.g., creating or updating one or more objects in a cluster-side Kubernetes data store 220), thereby prompting service extensions 114 to actuate the management operations embodied by those intent objects on the cluster.

With respect to data sync channel 210, once the state of cluster 104 has been modified in accordance with one or more intent objects received via intent channel 202, data sync agent 212 of cluster 104 can detect those state changes (which may include, e.g., changes to objects in Kubernetes data store 220) and can send a stream of events identifying the state changes to data sync ingest module 214 of MCM system 102. In response, data sync ingest module 214 can partition the incoming events based on a partition key comprising an originating cluster ID (i.e., the ID of the cluster that sent the event) and a resource type (i.e., the type of object(s) affected by the event) and can store the events according to their assigned partitions as streams within streaming data platform 216. As used herein, a "streaming data platform" is a data store that exhibits the following characteristics: (1) the ability for data to be published to, and consumed from, the data store as streams of records, organized into partitions (also known as "topics"), (2) the ability to store the streams of records in a fault-tolerant and durable manner, and (3) the ability to process the streams of records in real-time or near real-time. In a particular embodiment, streaming data platform 216 of MCM system 102 may be implemented using Apache Kafka. In other embodiments, streaming data platform 216 may be implemented using any other type of data store that conforms to the foregoing characteristics.

Finally, once the events from cluster 104 have been placed in streaming data platform 216 according to their respective partitions, services 112(1)-(M) of MCM system 102 can concurrently consume the events on a per-partition basis via a stream interface provided by data sync egest module 218.

With the general framework shown in FIG. 2 and described above, a number of benefits are achieved. First, by (1) representing management operations initiated by users 110 as intent objects that define a desired state of cluster 104 (rather than as commands to execute the operations), (2) storing the intent objects synchronously (i.e., upon object creation) in intent data store 206, and (3) propagating the stored intent objects asynchronously (i.e., in response to poll requests from intent agent 208) to cluster 104, this framework can minimize or avoid the problems arising out of a lossy or intermittent network connection between MCM system 102 and cluster 104. For example, consider once again the scenario where user A creates namespace N, deletes the namespace, and then creates it again. As noted previously, if these three management operations are represented as a sequence of three control commands "create namespace N," "delete namespace N," and "create namespace N" and a network problem occurs that causes the "delete namespace N" command to be received last by, e.g., cluster 104, the namespace will be erroneously deleted without being subsequently recreated in the cluster. However, if these three operations are represented by three intent objects that define the desired states "namespace N exists," "namespace N does not exist," and "namespace N exists" (along with associated timestamps specifying the time at which those objects were created), the order in which cluster 104 receives the intent objects does not matter. Instead, the cluster can simply apply the intent objects to the cluster according to their respective timestamps, because the intent object with the latest timestamp will reflect the latest desired state of the cluster (regardless of when it was received). In addition, because intent objects are aggregated in intent data store 206, cluster 104 does not need to be online at all times in order to receive them; instead, intent agent 208 of cluster 104 can request the cluster's intent objects from intent service 204 whenever the cluster is ready and available.

Second, by partitioning the event streams received from clusters 104(1)-(N) via data sync ingest module 214 and making these partitions available to services 112(1)-(M) in a streaming, concurrent manner via streaming data platform 216 and data sync egest module 218, data sync channel 210 can efficiently handle large volumes of incoming status data from clusters 104(1)-(N). This, in turn, enables MCM system 102 to scale across a large number of clusters.

Third, because framework 200 handles the details of transmitting intent objects to clusters 104(1)-(N) and receiving status information back from each cluster, the developers of services 112(1)-(M) do not need to write any code pertaining to these communications paths as part of creating a new service (other than code for providing the appropriate "desired state" data structures to intent service 204). Thus, the service developers can focus on implementing the user-facing functionalities of their respective services and rely on framework 200 for facilitating communication between MCM system 102 and clusters 104(1)-(N) in a reliable and scalable manner.

The remaining sections of the present disclosure provide additional details regarding the workflows that may be executed by MCM system 102 and cluster 104 for implementing intent channel 202 and data sync channel 210 respectively according to certain embodiments. It should be appreciated that framework 200 depicted in FIG. 2 is illustrative and not intended to limit embodiments of the present disclosure. For example, although FIG. 2 depicts a particular arrangement of components in framework 200, other arrangements are possible (e.g., the functionality attributed to a particular component may be split into multiple components, components may be combined, etc.). Further, the various components shown may have subcomponents or functions that are not specifically described. One of ordinary skill in the art will recognize other variations, modifications, and alternatives.

3. Intent Channel Workflows

Figure 3A:
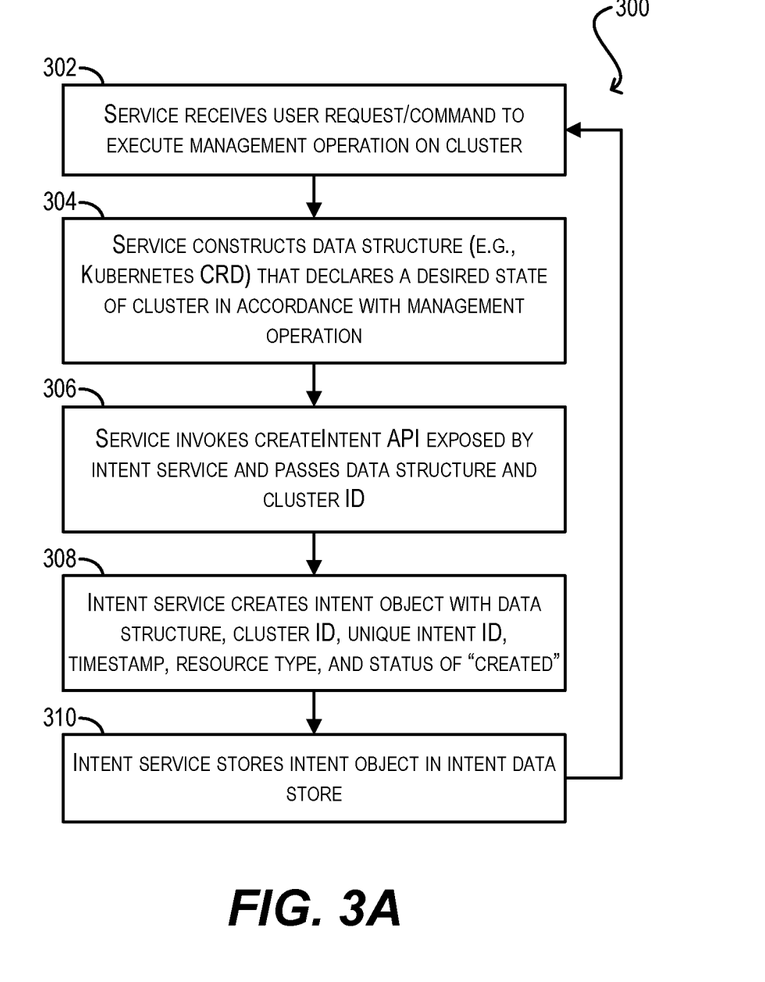
FIGS. 3A and 3B depict workflows for implementing the intent channel of the framework of FIG. 2 according to certain embodiments.
Figure 3B:
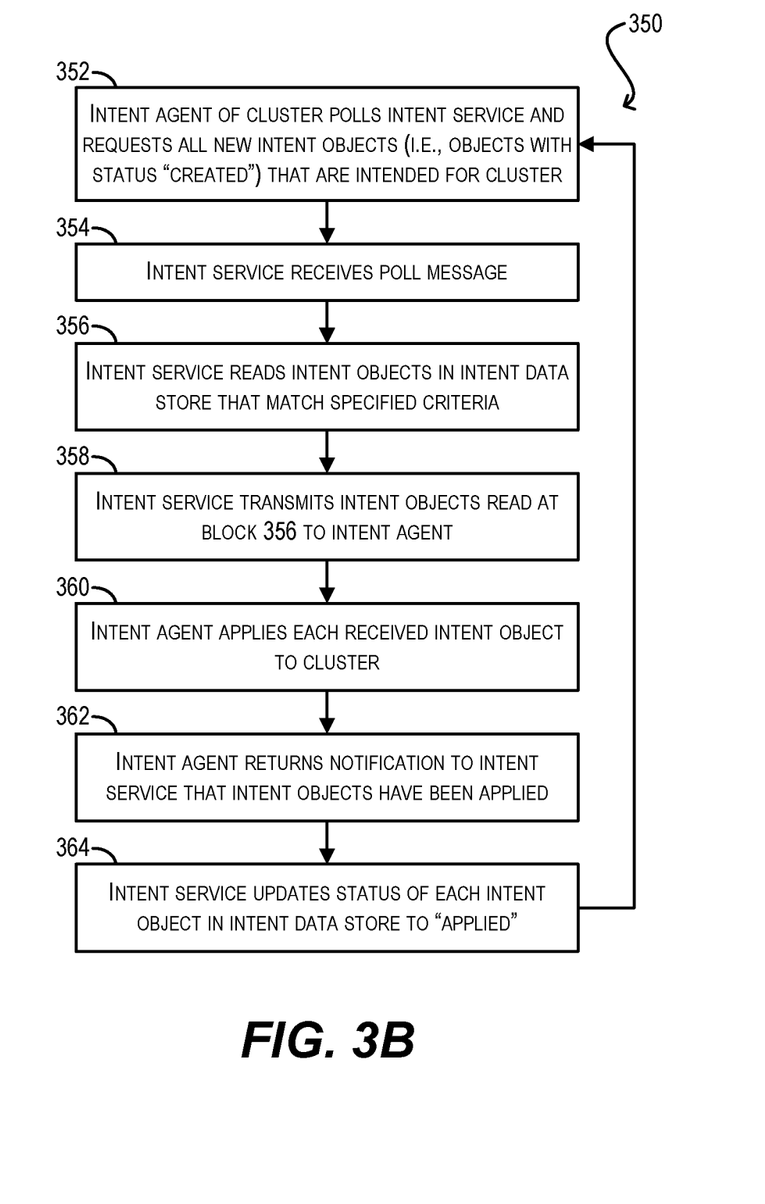

FIGS. 3A and 3B depict workflows 300 and 350 that may be executed by various components of MCM system 102 and cluster 104 for implementing intent channel 202 of FIG. 2 according to certain embodiments. In particular, workflow 300 of FIG. 3A may be executed by a service 112 and intent service 204 of MCM system 102 for creating/storing intent objects directed to cluster 104 in intent data store 206, and workflow 350 of FIG. 3B may be executed by intent agent 208 of cluster 104 and intent service 204 for asynchronously propagating the stored intent objects to cluster 104.

Starting with block 302 of workflow 300 in FIG. 3A, a service 112 of MCM system 102 can receive (via, e.g., UI 108) a user request/command to execute a management operation on cluster 104. Examples of such management operations include creating/updating/deleting a namespace, setting an access policy, starting or canceling an inspection scan, and so on.

At block 304, service 112 can construct a data structure that defines/declares a desired state of cluster 104 in accordance with the management operation. As mentioned previously, this desired state can indicate a state that one or more objects of the cluster should be in, assuming the management operation is successfully applied to the cluster. In a particular embodiment, the data structure can take the form of a Kubernetes CRD that is registered with the Kubernetes control plane of cluster 104.

Upon constructing the data structure at block 304, service 112 can invoke an application programming interface (API) exposed by intent service 204 for creating a new intent object based on the data structure (e.g., a "createIntent" API) (block 306). As part of this step, service 112 can provide the data structure and an ID of the cluster to which the intent object is directed (i.e., cluster 104 in this example) as input parameters to the API.

In response to the API invocation, intent service 204 can create an intent object that includes (1) the data structure constructed by service 112, (2) a unique intent ID, (3) the cluster ID received from service 112, (4) a timestamp indicating the time of object creation, (5) a resource type indicating the type of cluster object to which the intent object applies (e.g., namespace, inspection scan, user role binding, etc.), and (6) a status indicating a current status of the intent object (block 308). Because the intent object is newly created at this point and has not yet been communicated to any cluster, the status field can be initialized to a value that indicates this (e.g., "CREATED").

Intent service 204 can then store the created intent object in intent data store 206 (block 310) and workflow 300 can return to block 302 so that additional user requests/commands can be handled.

Turning now to workflow 350 of FIG. 3B, at block 352 intent agent 208 of cluster 104 can send a poll message to intent service 204 requesting all of the intent objects in intent data store 206 that (1) are directed to cluster 104, and (2) have a status indicating that the intent object has not yet been applied to the cluster (e.g., the previously mentioned "CREATED" status).

At blocks 354, 356, and 358, intent service 204 can receive the poll message, read all of the intent objects in intent data store 206 that match criteria (1) and (2) above, and transmit those intent objects to intent agent 208.

Upon receiving the intent objects, intent agent 208 can apply each intent object to cluster 104 (block 360). In certain embodiments, this step can involve extracting the data structure (e.g., Kubernetes CRD) encapsulated in each intent object and persisting that data structure/CRD as a new Kubernetes object in Kubernetes data store 220. This, in turn, can cause a service extension on cluster 104 that is associated with service 112 (i.e., the service that originally constructed the data structure at block 304) to access the newly created Kubernetes object from data store 220 and take one or more actions for executing the corresponding management operation on the cluster.

Intent agent 208 can subsequently return a notification to intent service 204 indicating that all intent objects transmitted at block 358 have now been applied to the cluster (block 362). In response, intent service 204 can update the status field of each of these intent objects in intent data store 206 to reflect this new status (block 364). For example, intent service 204 may change the status field of each intent object from "CREATED" to "APPLIED." Finally, workflow 350 can return to block 352 when intent agent 208 is ready to send its next poll message to intent service 204 and the entire workflow can be repeated for each such polling interval.

It should be appreciated that workflows 300 and 350 of FIGS. 3A and 3B are illustrative and various modifications are possible. For example, although workflow 300 assumes that a new intent object is created in response to each user request/command to execute a management operation on cluster 104, in some cases the requested management operation may apply to a cluster object that is already associated with an intent object maintained in intent data store 206. For example, the user may wish to delete a namespace that was previously created (and thus represented as an existing intent object for the creation request/command). In these cases, service 112 can invoke an API exposed by intent service 204 for providing a new data structure/CRD for the existing intent object (e.g., an "updateIntent" API), and intent service 204 can thereafter update that existing intent object in intent data store 206 with the new data structure/CRD (rather than creating a brand new intent object). Thus, with this enhancement, multiple management changes to the same cluster object can be effectively collapsed into a single intent object, thereby saving space in intent data store 206 and potentially reducing the number of intent objects that need to be communicated to intent agent 208.

4. Data Sync Channel Workflow

Figure 4:
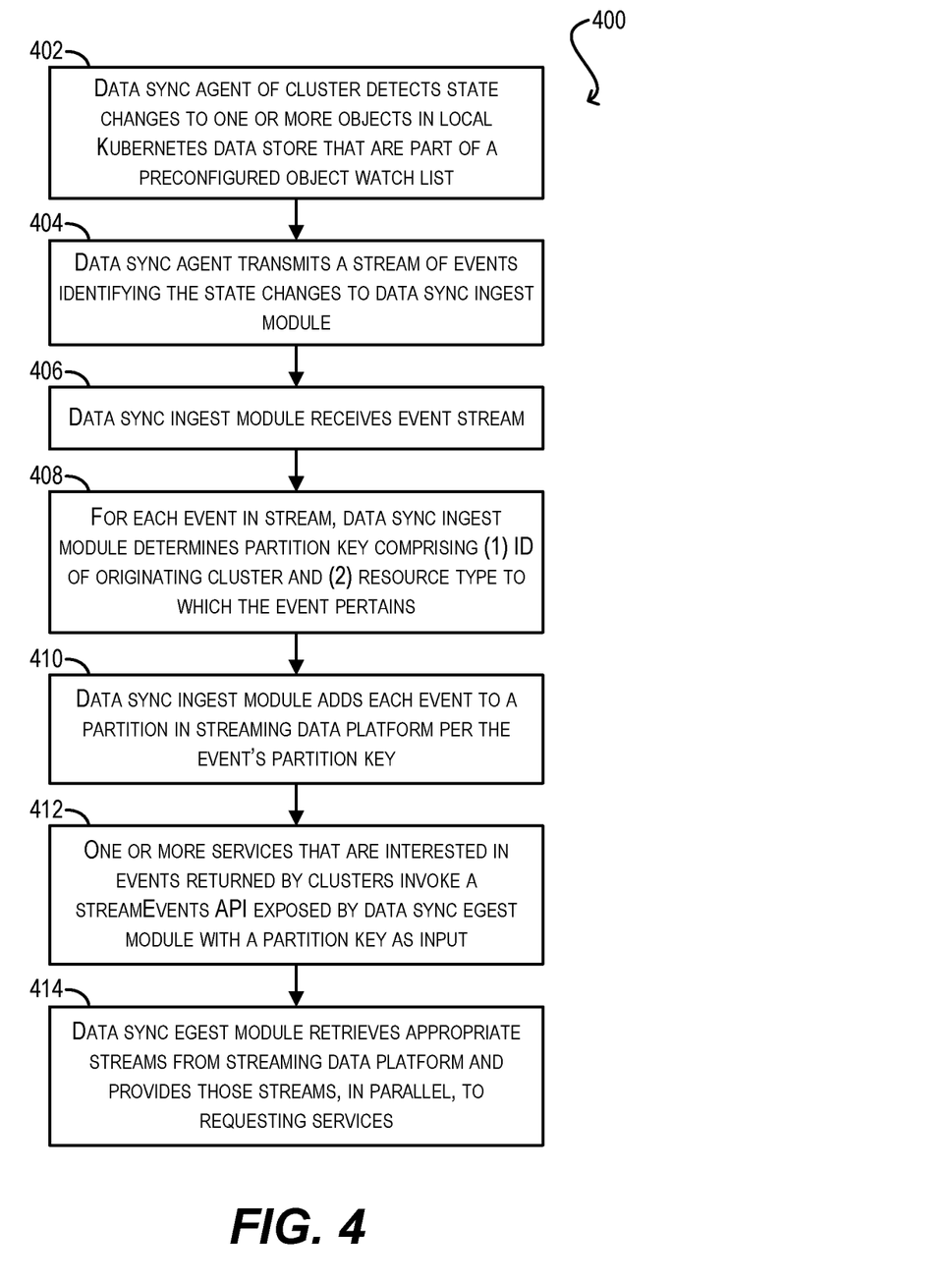
FIG. 4 depicts a workflow for implementing the data sync channel of the framework of FIG. 2 according to certain embodiments.

FIG. 4 depicts a workflow 400 that may be executed by various components of cluster 104 and MCM system 102 for implementing data sync channel 210 of FIG. 2 according to certain embodiments. Workflow 400 assumes that one or more intent objects have been received by intent agent 208 and applied to cluster 104, resulting in state transitions within the cluster.

Starting with blocks 402 and 404, data sync agent 212 of cluster 104 can detect state changes to one or more objects in Kubernetes data store 220 that part of a preconfigured "object watch list" and can transmit a stream of events identifying these state changes to data sync ingest module 214 of MCM system 102. In a particular embodiment, the preconfigured object watch list can be specified via special "sync watch" intent object that is transmitted from MCM system 102 to cluster 104 via intent channel 202 and stored in Kubernetes data store 220 at the time of cluster power-on/initialization.

At blocks 406 and 408, data sync ingest module 214 can receive the stream of events from data sync agent 212 and, for each event in the stream, determine a partition key comprising (1) the ID of the originating cluster (e.g., cluster 104) and (2) and the resource type of the cluster object to which the event pertains. For example, if the event identifies a state change to a namespace object, the resource type determined at block 408 would be the "namespace" resource type.

Data sync ingest module 214 can then add each event to a partition within streaming data platform 216 according to the event's partition key (block 410). For instance, data sync ingest module 214 can add all the events originating from cluster 104 and associated with resource type R1 to a first partition P1, all events originating from cluster 104 and associated with a resource type R2 to a second partition P2, and so on. As part of this step, data sync ingest module 214 can ensure that the relative ordering of events (as defined in the stream received from data sync agent 212) is preserved at the time the events are added to their respective partitions in streaming data platform 216.

At block 412, one or more services 112(1)-(M) of MCM system that are interested in the events being returned by cluster 104 (and/or other clusters managed by MCM system 102) can invoke an API exposed by data sync egest module 218 (e.g., a "streamEvents" API) to consume, in a streaming fashion, the events within one or more specified partitions in streaming data platform 216. For instance, if a service 112 previously created and submitted an intent object via intent channel 202 for creating a new object of resource type R1 in cluster 104(1), that service may invoke the streamEvents API with an input parameter specifying the partition key [cluster 104(1), R1] in order to consume the events in that partition and thereby confirm whether the new object has been created.

Finally, at block 414, data sync egest module 218 can retrieve the appropriate streams from streaming data platform 216 and provide those streams, in parallel, to the requesting services for their consumption.

5. Cleaning Up Processed Intent Objects

Figure 5:
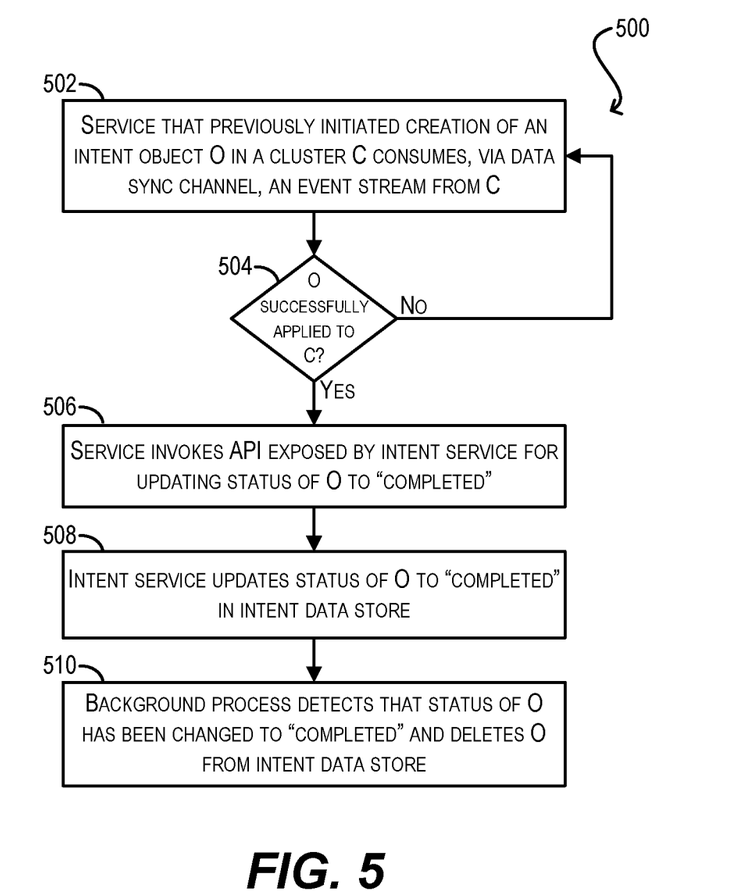
FIG. 5 depicts a workflow for cleaning up processed intent objects according to certain embodiments.

Once an intent object has been transmitted to its target cluster(s) and applied there via intent channel 202, it would be useful to remove the intent object from intent data store 206 because it is no longer needed. FIG. 5 depicts a workflow 500 for cleaning up such processed intent objects according to certain embodiments.

Starting with blocks 502 and 504, a service 112 that previously initiated the creation of an intent object O on a particular cluster C can consume, via data sync channel 210. an event stream from cluster C and check whether intent object O has been successfully applied (in other words, whether the current state of cluster C matches the desired state specified in intent object O). If the answer is no, service 112 can re-execute blocks 502 and 504 after some period of time.

However, if the answer at block 504 is yes, service 112 can invoke an API exposed by intent service 204 to update the status of intent object O to a value that indicates the intent object has been processed and is no longer needed (e.g., "COMPLETED") (block 506), and intent service 204 can update the status of intent object O in intent data store 206 in accordance with that invocation (block 508).

Finally, at block 510, a background process of MCM system 102 that is configured to continuously poll intent data store 206 for processed intent objects can detect that the status of intent object O has been changed to "COMPLETED" and can delete the intent object from intent data store 206.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Yet further, one or more embodiments can relate to a device or an apparatus for performing the foregoing operations. The apparatus can be specially constructed for specific required purposes, or it can be a general-purpose computer system selectively activated or configured by program code stored in the computer system. In particular, various general-purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid-state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for facilitating communication between a multi-cluster management (MCM) system and a cluster managed by the MCM system, the method comprising:
   receiving, by a computer system running the MCM system, a user command to execute a management operation on the cluster;
   generating, by the computer system, an intent object based on the user command, the intent object including a data structure that comprises a desired state of the cluster in accordance with the management operation, an identifier of the cluster, and a timestamp indicating a time at which the intent object was generated;
   storing, by the computer system, the intent object in an intent data store of the MCM system;
   receiving, by computer system from the cluster, a poll message requesting all new intent objects in the intent data store that are intended for the cluster; and
   in response to the poll message:
   reading the intent object from the intent data store; and
   transmitting the intent object to the cluster.

2. The method of claim 1 wherein upon receiving the intent object, an intent agent running on the cluster is configured to:
   create one or more objects in a local data store of the cluster based on the data structure included in the intent object.

3. The method of claim 2 wherein creation of the one or more objects in the local data store causes the management operation to be executed on the cluster.

4. The method of claim 1 wherein the cluster is a Kubernetes cluster and wherein the data structure included in the intent object is a Kubernetes custom resource definition (CRD).

5. The method of claim 1 further comprising:
   receiving, from the cluster, a stream of events identifying one or more state changes to objects in the cluster; and
   determining, for each event in the stream, a partition key comprising (1) the identifier of the cluster and (2) a resource type of an object to which the event pertains.

6. The method of claim 5 further comprising:
   storing each event in a partition of a streaming data platform based on the event's partition key.

7. The method of claim 6 wherein a plurality of services of the MCM system are configured to consume events stored in the streaming data platform in a parallel manner.

8. A non-transitory computer readable storage medium having stored thereon program code executable by a computer system running a multi-cluster management (MCM) system, the program code embodying a method for facilitating communication between the MCM system and a cluster managed by the MCM system, the method comprising:
   receiving a user command to execute a management operation on the cluster;
   generating an intent object based on the user command, the intent object including a data structure that comprises a desired state of the cluster in accordance with the management operation, an identifier of the cluster, and a timestamp indicating a time at which the intent object was generated;
   storing the intent object in an intent data store of the MCM system;
   receiving, from the cluster, a poll message requesting all new intent objects in the intent data store that are intended for the cluster; and in response to the poll message:
  reading the intent object from the intent data store; and
  transmitting the intent object to the cluster.

9. The non-transitory computer readable storage medium of claim 8 wherein upon receiving the intent object, an intent agent running on the cluster is configured to:
  create one or more objects in a local data store of the cluster based on the data structure included in the intent object.

10. The non-transitory computer readable storage medium of claim 9 wherein creation of the one or more objects in the local data store causes the management operation to be executed on the cluster.

11. The non-transitory computer readable storage medium of claim 8 wherein the cluster is a Kubernetes cluster and wherein the data structure included in the intent object is a Kubernetes custom resource definition (CRD).

12. The non-transitory computer readable storage medium of claim 8 wherein the method further comprises:
  receiving, from the cluster, a stream of events identifying one or more state changes to objects in the cluster; and
  determining, for each event in the stream, a partition key comprising (1) the identifier of the cluster and (2) a resource type of an object to which the event pertains.

13. The non-transitory computer readable storage medium of claim 12 wherein the method further comprises:
  storing each event in a partition of a streaming data platform based on the event's partition key.

14. The non-transitory computer readable storage medium of claim 13 wherein a plurality of services of the MCM system are configured to consume events stored in the streaming data platform in a parallel manner.

15. A computer system executing a multi-cluster management system (MCM), the computer system comprising:
  a processor; and
  a non-transitory computer readable medium having stored thereon program code that, when executed by the processor, causes the processor to:
    receive a user command to execute a management operation on the cluster;
    generate an intent object based on the user command, the intent object including a data structure that comprises a desired state of the cluster in accordance with the management operation, an identifier of the cluster, and a timestamp indicating a time at which the intent object was generated;
    store the intent object in an intent data store of the MCM system;
    receive, from the cluster, a poll message requesting all new intent objects in the intent data store that are intended for the cluster; and
    in response to the poll message:
      read the intent object from the intent data store; and
      transmit the intent object to the cluster.

16. The computer system of claim 15 wherein upon receiving the intent object, an intent agent running on the cluster is configured to:
  create one or more objects in a local data store of the cluster based on the data structure included in the intent object.

17. The computer system of claim 16 wherein creation of the one or more objects in the local data store causes the management operation to be executed on the cluster.

18. The computer system of claim 15 wherein the cluster is a Kubernetes cluster and wherein the data structure included in the intent object is a Kubernetes custom resource definition (CRD).

19. The computer system of claim 15 wherein the program code further causes the processor to:
  receive, from the cluster, a stream of events identifying one or more state changes to objects in the cluster; and
  determine, for each event in the stream, a partition key comprising (1) the identifier of the cluster and (2) a resource type of an object to which the event pertains.

20. The computer system of claim 19 wherein the program code further causes the processor to:
  store each event in a partition of a streaming data platform based on the event's partition key.

21. The computer system of claim 20 wherein a plurality of services of the MCM system are configured to consume events stored in the streaming data platform in a parallel manner.

* * * * *